United States Patent [19]
Lahijani et al.

[11] Patent Number: 5,137,781
[45] Date of Patent: Aug. 11, 1992

[54] PROTECTED BRITTLE FIBER YARNS

[75] Inventors: Jacob Lahijani, Wilmington; Samuel E. Moore, Sr., Claymont; Paul E. Moran, Jr., Wilmington, all of Del.

[73] Assignee: E. I. Du Pont de Nemours and Company, Wilmington, Del.

[21] Appl. No.: 673,350

[22] Filed: Mar. 22, 1991

[51] Int. Cl.$^5$ .............................................. B32B 32/00
[52] U.S. Cl. ................................... 428/364; 428/367; 428/373; 428/374; 428/379; 428/375; 428/384
[58] Field of Search ............... 428/367, 375, 379, 384, 428/378, 373, 74

[56] References Cited

U.S. PATENT DOCUMENTS

| | | | |
|---|---|---|---|
| 3,579,623 | 5/1971 | Thomson et al. | 264/135 |
| 4,614,678 | 9/1986 | Ganga | 428/74 |
| 4,713,139 | 12/1987 | Ganga | 56/500 |
| 4,770,915 | 9/1988 | Nakagawa et al. | 428/376 |
| 4,772,502 | 9/1988 | Okura et al. | 428/74 |
| 4,902,453 | 2/1990 | Okura et al. | 264/29.2 |

FOREIGN PATENT DOCUMENTS 0406067  1/1991  European Pat. Off. .

*Primary Examiner*—Patrick J. Ryan
*Assistant Examiner*—N. Edwards

[57] ABSTRACT

Brittle fibers such as ceramic or carbon fibers are protected by a shroud of thermoplastic material surrounding the core. Such enshrouded yarns facilitate formation of fiber preforms used in the preparation of composite materials.

6 Claims, 3 Drawing Sheets

100μ = 8.2 mm

100μ = 8.2 mm

PROTECTED BRITTLE FIBER YARNS

BACKGROUND OF THE INVENTION

This invention relates to yarns of brittle fibers protected by a thermoplastic shroud. These enshrouded yarns are useful in the preparation of preforms for making composite materials.

Advanced composite materials in which a matrix material is reinforced with fibers provide increased value-in-use over conventional materials. Metal matrix composites (MMC) exhibit high strength to weight ratios. Ceramic matrix composites (CMC) provide better property retention at elevated temperatures and/or in harsh environments or a combination of these desirable and enabling features. Plastic or resin matrix materials are also particularly useful in many situations.

The basic performance attributes of the matrix material are enhanced by the contributions of the reinforcing fiber(s). Especially useful are inorganic fibers based on aluminum oxide, silicon carbide or high modulus carbon fibers derived from pitch However, prior to infiltration of the fibers by the desired matrix material, a useful assembly of such reinforcing fibers, conventionally termed a preform, must be fabricated, usually in a shape near the net shape of the desired composite.

Preform preparation is especially difficult with such advanced reinforcing fibers as those identified above because, along with the desirable stiffness properties, there is an attendant difficulty in handling these fibers owing to their brittle nature. This is a well-recognized problem in the art and is addressed, for example, in McAliley et al. (U.S. Pat. No. 4,714,642), who propose a method of tow consolidation to permit ease of handling during the preparation of plastic or resin-matrix composites. Their process is enabled by use of polyacrylonitrile fibers, i.e., flexible textile-like materials, as the carbon fiber precursor, and the intended end-use is reinforcement of thermoplastic or thermosetting resins. Another avenue to handling brittle fibers is disclosed in Ganga (U.S. Pat. No. 4,614,678 and U.S. Pat. No. 4,713,139) wherein the intended matrix material, in particulate form, is incorporated in the fiber tow and contained there by a thermoplastic sheath. The resulting tow (or "roving") can be woven, braided, etc. then heated to form the desired composite. The sheath material may or may not be included in the resulting composite, depending on its melting point and decomposition characteristics, relative to the matrix material. A related development wherein the desired matrix is carbon is provided by Okura et al. (U.S. Pat. No. 4,772,502 and U.S. Pat. No. 4,902,453). The sleeve material enables further processing such as filament winding, weaving, etc. prior to converting by heat the precursor material (binder pitch, etc.) to provide carbon-carbon composites. Both Ganga and Okura et al. provide fibrous prepregs rather than more complex shapes and include matrix material or precursors thereof at the very beginning of their processes. The end result is not unlike melt coating, where the matrix is applied via the melt to the tow. Characteristically the result is monofilicity, where the tow acts as a rod rather than a yarn because the individual component filaments are not free to move relative to one another and therefore may break more easily than bend.

Reinforcement of resins or plastics (e.g., by prepregging) is much less demanding than reinforcement of metals, often infiltrated from the melt, or of ceramics, often done at high temperatures by chemical vapor infiltration. The stiffer, more costly and more brittle fibers used for MMC or CMC reinforcement—plus the requirement of preforming assemblies of such fibers to near net shape—imposes serious, additional performance and handling demands prior to infiltration. Fibers may be embedded in wax or resin (Dhingra; U.S. Pat. No. 4,869,339) to form sheets that can be laid up, etc., to form simple shapes. Filament winding to simple shapes is also possible. But the rigors of weaving, braiding and the like cannot be met by ceramic or carbon fiber yarns or tows in the unassisted state. Even in the as-produced state these tows have broken filaments that protrude, snag on guides, etc., and generally contribute to increased damage. Accordingly such tows may be wrapped with cellulosic (e.g., rayon) or thermoplastic yarns or fibers to assist in their processing. However, when such protective wrappers later are burned off, their shrinkage that attends decomposition will "cut" the reinforcement fiber and increase rather than decrease broken filaments. Twisting is not an option: additional damage is incurred, strength is diminished and interstitial volume available for infiltration by matrix material is decreased.

This invention protects brittle inorganic reinforcing fibers, specifically multifilamentary yarns and tows thereof, from damage due to processing, and allows sufficient interfilament mobility and permits reasonable bending without bundle breakage. Using the protected yarns of this invention useful woven, braided, etc. assemblies thereof can not only be prepared but such assemblies thereafter can be further handled and aggregated into useful three-dimensional preforms of near net shape, even where the desired shape is complex.

SUMMARY OF THE INVENTION

This invention provides enshrouded yarns having a core of yarn surrounded by a protective shroud. The core consists essentially of substantially untwisted continuous multifilament yarn or tow of inorganic fibers composed of metal oxides, carbides or carbon fibers derived from mesophase pitch. As used here, the term "consists essentially of" means that the fibers are free of matrix material or other agents that would bond them together, but individual fibers may have coatings such as sizing, lubricants, finishes etc. Preferably the fibers are free to move relative to one another and relative to the shroud. The yarn core is surrounded by a shroud which is a thermally fugitive thermoplastic material protectively surrounding but not penetrating the yarn core. The thickness of the shroud does not exceed about 15% that of the average diameter of the yarn core.

The preferred material for the shroud is polyethylene. Preferred fibers are mesophase pitch-based carbon fibers, aluminum oxide, silicon carbide, mixtures of alumina with one or more of yttria, zirconia or hafnia or pitch carbon filaments. Note that the terms "yarn" and "tow", as used herein, denote aggregations of substantially continuous inorganic filaments, "yarns" usually referring to an as-produced aggregation of such filaments (for example, 200 filaments of alumina fiber or 500 filaments of pitch-based carbon fiber) and "tow" usually referring to an assembly of two or more yarns to provide a larger number of filaments (e.g., 1000–5000 filaments; terminology is "1 to 5 K tows"), a higher lineal weight (e.g., denier) and a lower "yield" (i.e, yards per pound of tow).

DETAILED DESCRIPTION OF THE INVENTION

The fibers useful in preparing the enshrouded yarns of this invention are known. Alumina fibers are described in Seufert, U.S. Pat. No. 3,808,015. Silicon carbide fibers are described in Bolt et al., U.S. Pat. No. 4,942,011. Silicon carbide fibers having the name "Nicalon" are also available commercially from Dow-Corning. Ptich-based carbon fibers are described in Lahijani, U.S. Pat. No. 4,915,925 and in Jennings and Ross, EP 0 383,339. Fibers which are mixtures of alumina and zirconia, yttria and/or hafnia are described in Wolfe, U.S. Pat. No. 4,753,904 and Ramachandran, U.S. Pat. No. 4,921,819.

The shroud of this invention is made from thermally fugitive thermoplastic materials. The polyolefins—polyethylene, polypropylene, polystyrene, etc.—are preferred shroud compositions. Polyethylene is the most preferred material. However, other thermoplastic materials such as the moldable acrylates, polyamides, polyesters, etc. also are acceptable, provided that pyrolytic degradation substantially without residue formation can be achieved, usually after the preform manufacture. Lower melting materials also are preferred in order that shrinkage of the shroud prior to melting is minimized and any such shrinkage forces are too low to damage the yarn or tow. Chemical and rheologic stability of the polymer melt with time also is needed in order to control and maintain the thickness and thickness uniformity of the shroud during and between preparative runs.

Figure 1:
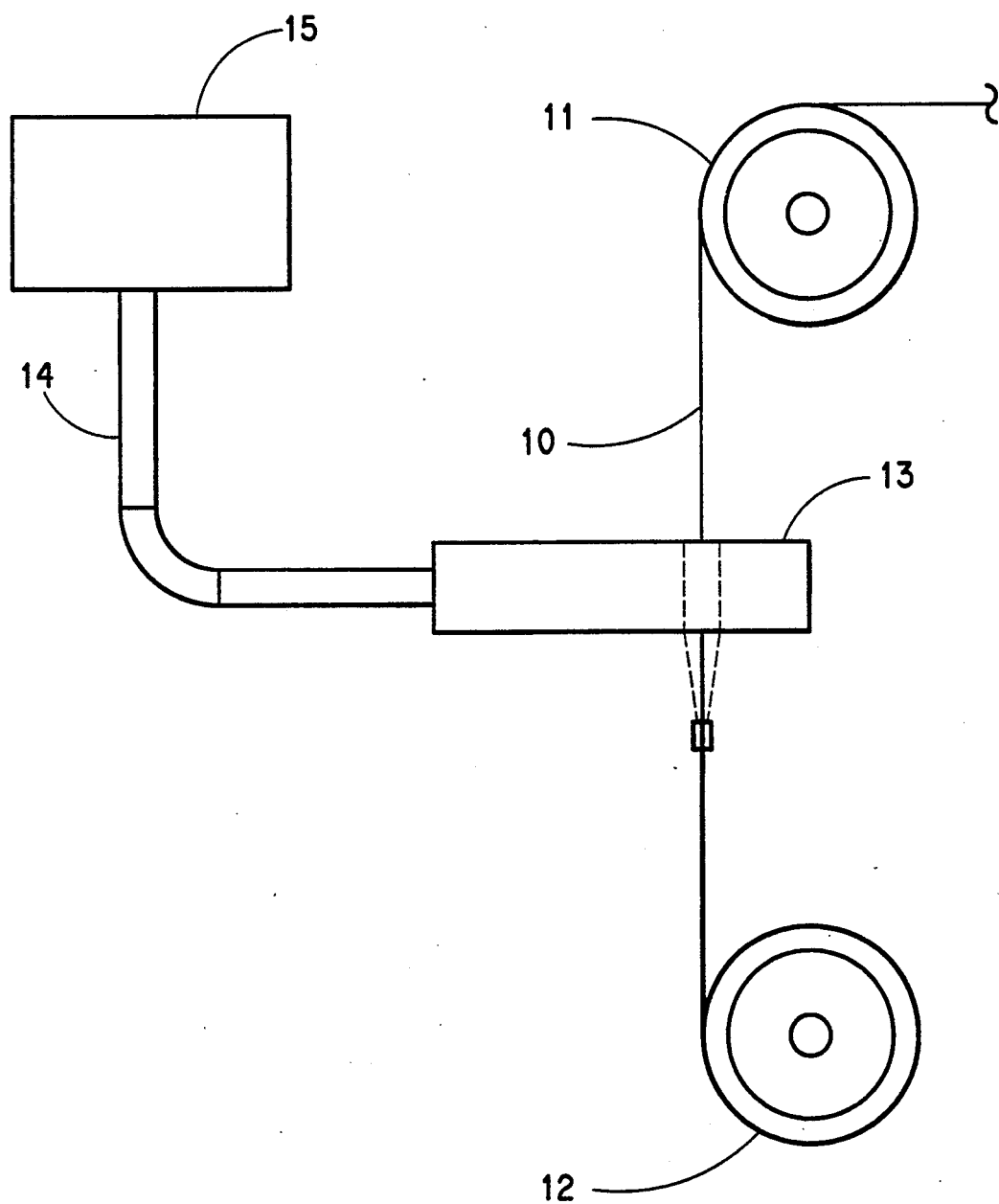
FIG. 1 is a schematic display of an apparatus suitable for enshrouding a mutifilament yarn or tow.
Figure 2:
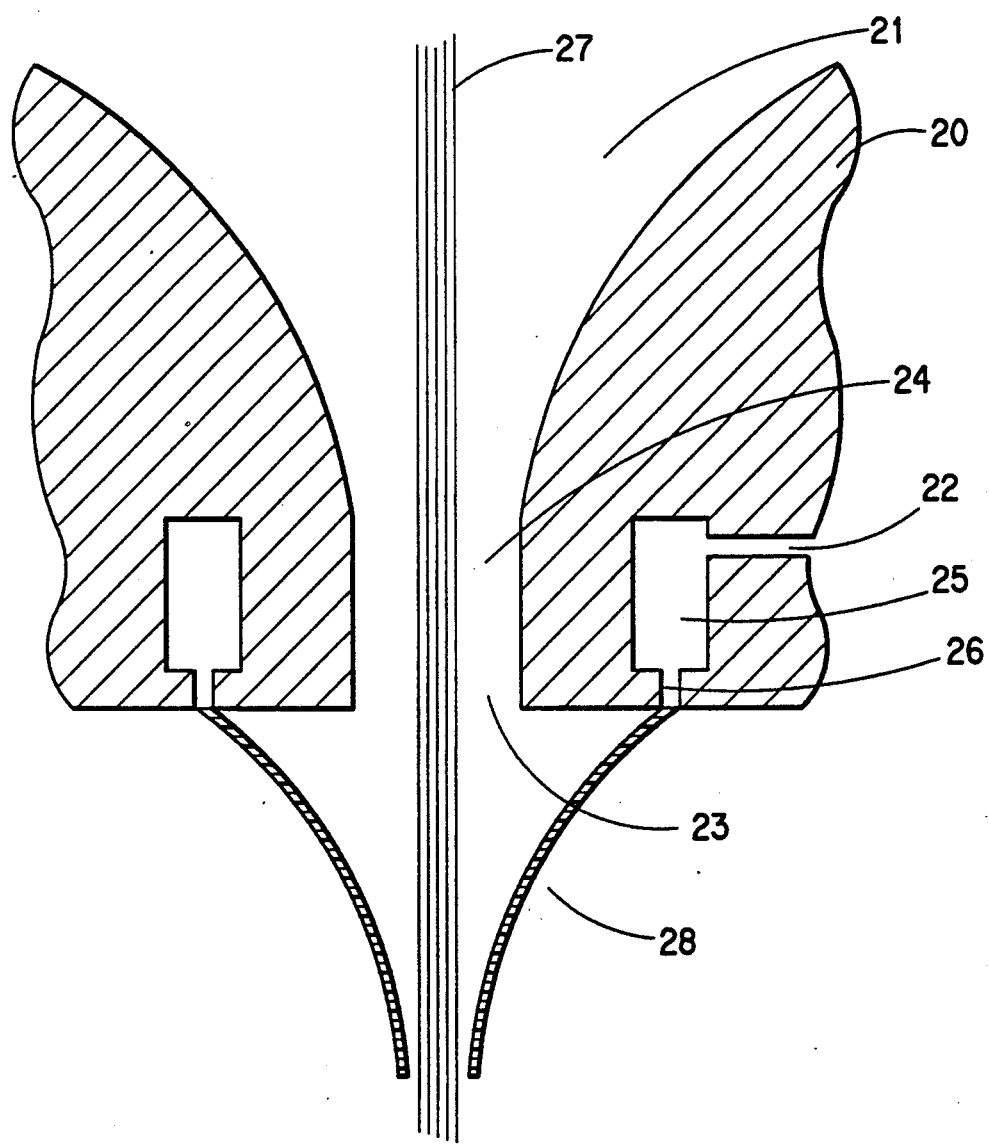
FIG. 2 is a enlarged section view of the enshrouding die used in FIG. 1 to apply the polymeric shroud.

The manufacture of the enshrouded yarns of this invention is carried out in an apparatus shown in FIGS. 1 and 2. Referring to FIG. 1, brittle pitch carbon or inorganic yarn or tow 10 is advanced from a supply package (not shown) by forwarding means 11 to takeup means 12 through the shroud applicator means 13 (e.g., the die of FIG. 2). Forwarding and take-up means 11 and 12 may be pulleys wherein the yarn or tow runs in a "V"-shaped guide surface to more precisely locate the threadline with respect to the applicator means 13. Yarn or tow 10 may be more than one end supplied by creel means (not shown) where the effect of doubling, plying, etc. may be desired. Applicator means 13 is provided with molten polymer through transfer line 14 from reservoir 15 which contains molten polymer and/or means for melting the polymer (neither shown). FIG. 2 shows the enshrouding die 20 comprised of conical inlet section 21, molten polymer flow inlet 22, yarn through-hole 24, annular polymer flow conduit 25 and annular shroud extrusion outlet 26. In operation as shown, the yarn or tow 27 enters the die at inlet 20 and exits at yarn outlet 23, where shroud 28 is applied by extrusion through outlet 26. Note that the shroud 28 as extruded is considerably larger in inside diameter than the yarn or tow 27 and that nowhere does shroud polymer contact the yarn or tow until the polymer is solidified (i.e., is quenched). The diameter of the shroud decreases while it shrinks during the solidification and also because of attenuation as the shroud is drawn from the die.

It would appear that the "coating die" in FIGS. 2 of both Ganga patents cited above might serve in an acceptable manner for the purposes of the instant invention.

Figure 3:
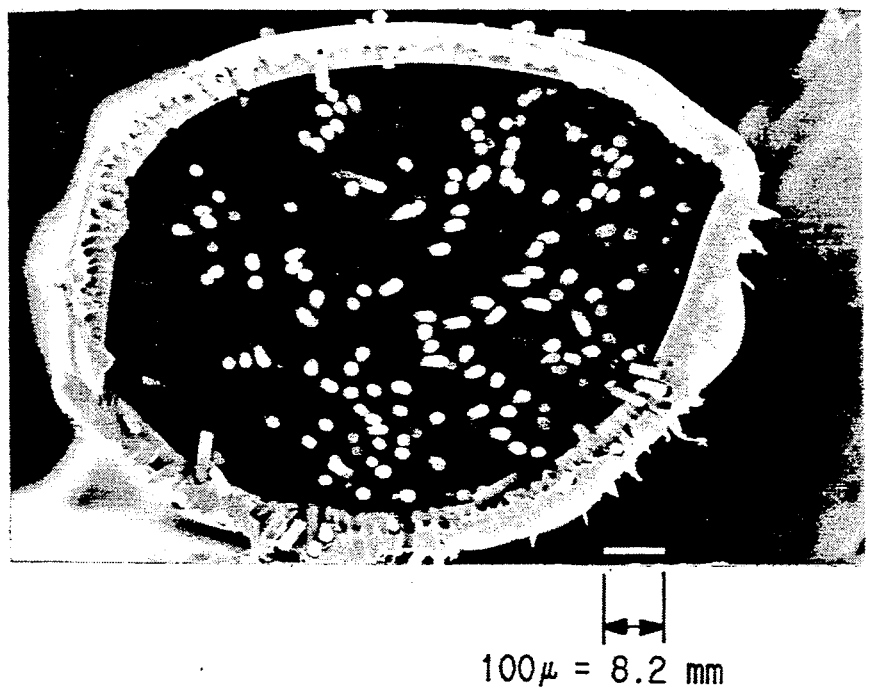
FIG. 3 is a photograph of the cross-section of an enshrouded tow prepared in accordance with the Example of this invention.

FIG. 3 shows the resulting enshrouded product comprised of filaments and the circumferential shroud surrounding and protecting the filaments. Shroud is relatively uniform in circumferential thickness and, although not shown, along its length as well. Further referring to FIG. 3, there is no evidence of the shroud polymer within and/or among the filaments. Indeed, the latter are substantially free to move relative to one another.

The enshrouded yarn shown in FIG. 3 is actually a 200 filament single ply yarn of Du Pont's "Fiber FP" alpha-alumina fiber and the shroud is composed of polyethylene. Shroud thickness relative to that of the yarn or tow being protected need not exceed that which is sufficient for the intended preform manufacture application. In general, a shroud thickness of about 50 micrometers has been sufficient. Material in excess of this generally provides diminishing benefit and increasing risk of polymer penetration into the core yarn and/or filament immobilization. Ideally the shroud is applied in such a way that the yarn or tow is protectively enclosed but not not so tightly as to impede filament mobility via a "squeezing" or a constricting mechanism. These conditions are simply met by extruding the polymer at a temperature above yet fairly near to its melting point, so that the polymer forming the shroud is quenched (solidified) almost immediately upon extrusion.

The enshrouded yarn is converted by conventional means into a preform. Winding, braiding and weaving are suitable techniques which may be used since the brittle yarns in the core are protected by the shroud. Once the preform is shaped, the thermally fugitive shroud material may be removed by pyrolysis leaving a residue-free preform.

The preform having the shroud material removed may then be infiltrated by known means with matrix material which may be a metal, a ceramic precursor or a ceramic. Preferably the infiltration is by molten metal induced by pressure, vacuum or even "pressureless" (cf. White et al., U.S. Pat. No. 4,828,008), by the directed oxidation of a suitable metal (cF. Newkirk et al., U.S. Pat. No. 4,851,375) to form a metal-oxide matrix, and by chemical vapor infiltration (Arens et al., U.S. Pat. No. 4,863,798) to provide a ceramic matrix.

Also within the scope of this invention are preforms made of multiple enshrouded yarns described above.

EXAMPLE

The apparatus shown in FIG. 2 was employed to enshroud feed yarns. Key dimensions are the following:

| | |
|---|---|
| overall thickness of die 20 | 0.71 inch |
| diameter yarn through-hole 24 | 0.07 inch |
| diameter extrusion outlet 26 | 0.248 inch |
| width of opening | 0.011 inch |

The polyethylene shroud material is "Aspun" 6813 (Dow) and described by the manufacturer as a fiber grade copolymer resin of ethylene and octene-1, the latter present in a quite small amount. The polymer was melted in a zone extruder and trasferred to die 20 at 220 deg. C. under a pressure of 1050 psi. The yarn 27 was 4-ply alumina "Fiber FP" from Du Pont (200 filament, ca. 20 micron diamter singles yarns). the yarn was processed at 20 meters per minute as determined by the winding speed of the take-up bobbin. The average shroud thickness was about 50 micrometers but varied from about 30 to about 70 micrometers around the circumference of the enshrouded yarn. Samples of this yarn were woven (8 harness satin) on a fly shuttle loom and both flat and tubular braids were made on a conventional textile braider. In a similar, related experiment, a single yarn end of "Fiber FP" alumina fiber yarn (200 filaments) was ensrouded; FIG. 3 is a cross-section photomicrograph thereof.

We claim:

1. An enshrouded yarn having a core consisting essentially of substantially untwisted continuous fibers selected from the group consisting of mesophase pitch-based carbon fibers, metal oxide fibers and metal carbide fibers and a shroud of thermally fugative thermoplastic surrounding said core wherein the shroud does not penetrate the core and the fibers are not bonded to the shroud, said fibers being free to move relative to one another and relative to the shroud.

2. An enshrouded yarn of claim 1 wherein the fibers are selected from the group consisting of silicon carbide, alumina and mixtures of alumina with a member selected from the group consisting of zirconia, hafnia and yttria.

3. An enshrouded yarn of claim 1 wherein the fibers are carbon fibers.

4. An enshrouded yarn of claim 1 wherein the thermoplastic shroud is polyethylene.

5. An enshrouded yarn of claim 2 wherein the thermoplastic shroud is polyethylene.

6. An enshrouded yarn of claim 3 wherein the thermoplastic shroud is polyethylene.

* * * * *